United States Patent [19]

Iwata et al.

[11] Patent Number: 4,752,903

[45] Date of Patent: Jun. 21, 1988

[54] ADAPTIVE DIGITAL FILTER FOR ELIMINATING HOWLING

[75] Inventors: Yoshihiro Iwata; Masahiro Koya, both of Tokyo, Japan

[73] Assignees: Hitachi Densi Kabushiki Kaisha; Hitachi, Ltd., both of Tokyo, Japan

[21] Appl. No.: 843,157

[22] Filed: Mar. 24, 1986

[30] Foreign Application Priority Data

Mar. 25, 1985 [JP] Japan .................................. 60-58426

[51] Int. Cl.⁴ .......................... G06F 15/31; H04B 3/20
[52] U.S. Cl. ....................................... 364/724; 379/411
[58] Field of Search .......................... 364/724; 379/411; 375/14

[56] References Cited

U.S. PATENT DOCUMENTS

| | | | |
|---|---|---|---|
| 4,507,747 | 3/1985 | Houdard et al. | 364/724 |
| 4,670,903 | 6/1987 | Araseki et al. | 379/411 |
| 4,679,230 | 7/1987 | Lassaux et al. | 379/411 |

Primary Examiner—David H. Malzahn
Attorney, Agent, or Firm—Blakely, Sokoloff, Taylor & Zafman

[57] ABSTRACT

An adaptive digital filter is connected in parallel with a transmission system and includes a plurality of delay circuits, a nonrecursive digital filter having coefficient parameters of the delay circuits so as to approximate the characteristics of the transmission system, and a correction circuit for correcting the coefficient parameters of the nonrecursive digital filter. The adaptive digital filter further includes a first variable attenuator, a second variable attenuator and a comparator. The first variable attenuator receives an input signal for the adaptive digital filter, variably attenuates the input signal in response to a first control signal, and supplies an attenuated input signal to the transmission system and the nonrecursive digital filter. The second variable attenuator receives a difference between the output signals from the nonrecursive digital filter and the transmission system and variably attenuates the difference signal in response to a second control signal. The attenuated difference signal serves as an output of the adaptive digital filter. The comparator compares the level of the input signal with the level of the output signal from the transmission system and drives the first or second attenuator, which receives a lower level signal when the level difference exceeds a predetermined value.

5 Claims, 3 Drawing Sheets

ADAPTIVE DIGITAL FILTER FOR ELIMINATING HOWLING

BACKGROUND OF THE INVENTION

The present invention relates to an adaptive digital filter which approximates with a nonrecursive digital filter the characteristics of a transmission system which is unknown or changes over time.

In a conventional adaptive digital filter, a nonrecursive digital filter with variable coefficient parameters is connected in parallel with a transmission system whose characteristics are unknown, and the unknown characteristics are approximated or simulated by the nonrecursive digital filter. In such an adaptive digital filter, a sequential correction algorithm is used to add a correction value to a coefficient parameter at a given time to obtain a coefficient parameter at a subsequent time. For example, if a speech signal is received at an input terminal of a transmission system including a loudspeaker and a microphone and transmitted from an output terminal thereof, the nonrecursive digital filter uses the adaptive algorithm to approximate feedback characteristics of the speech signal fed back to the microphone from the loudspeaker.

When the characteristics of the transmission system, i.e., the feedback characteristics between the loudspeaker and the microphone are abruptly changed, a certain period of time is required for the nonrecursive digital filter to approximate the changed characteristics of the transmission system with the adaptive algorithm. This approximation period lasts until an error signal eK, representing the difference between both characteristics, appears at the output terminal. For example, when a circuit such as an echo canceller between the input and output terminals serves as part of a loop and the level of the error signal eK is high, howling occurs. The nonrecursive digital filter cannot completely approximate the unknown characteristics of the transmission system, which change as a function of time, and thus an error is always present. This error must be minimized.

SUMMARY OF THE INVENTION

It is an object of the present invention to provide an adaptive digital filter for preventing howling in a loop circuit and minimizing the level of an error signal eK appearing at an output terminal when characteristics of the transmission system are abruptly changed.

In order to achieve the above object of the present invention, there is provided an adaptive digital filter, comprising: a nonrecursive digital filter for approximating the characteristics of a transmission system, the nonrecursive digital filter being provided with an input terminal connected to an input terminal of the transmission system, an output terminal connected to subtractor means for calculating a difference between an output from the nonrecursive digital filter and an output from the transmission system, a plurality of delay elements connected in series between the input and output terminals of the nonrecursive digital filter, and means for changing coefficient parameters of the plurality of delay elements; and a correction circuit for supplying signals for correcting the coefficient parameters to the nonrecursive digital filter, the adaptive digital filter further comprising: first variable attenuator means for receiving an input signal to the adaptive digital filter to variably attenuate the input signal in response to a first control signal and supplying a variably attenuated signal to the transmission system and the nonrecursive digital filter; second variable attenuator means for receiving a signal representing the difference and variably attenuating the difference signal in response to a second control signal, the variably attenuated difference signal being supplied as an output signal of the adaptive digital filter; and comparing means for obtaining a level difference between the input signal and the output of the transmission system and operating the first or second variable attenuator means which receives a smaller level signal when the level difference exceeds a predetermined value.

DETAILED DESCRIPTION OF THE PREFERRED EMBODIMENT

An adaptive digital filter according to an embodiment of the present invention will be described in detail with reference to the accompanying drawings.

Figure 1:
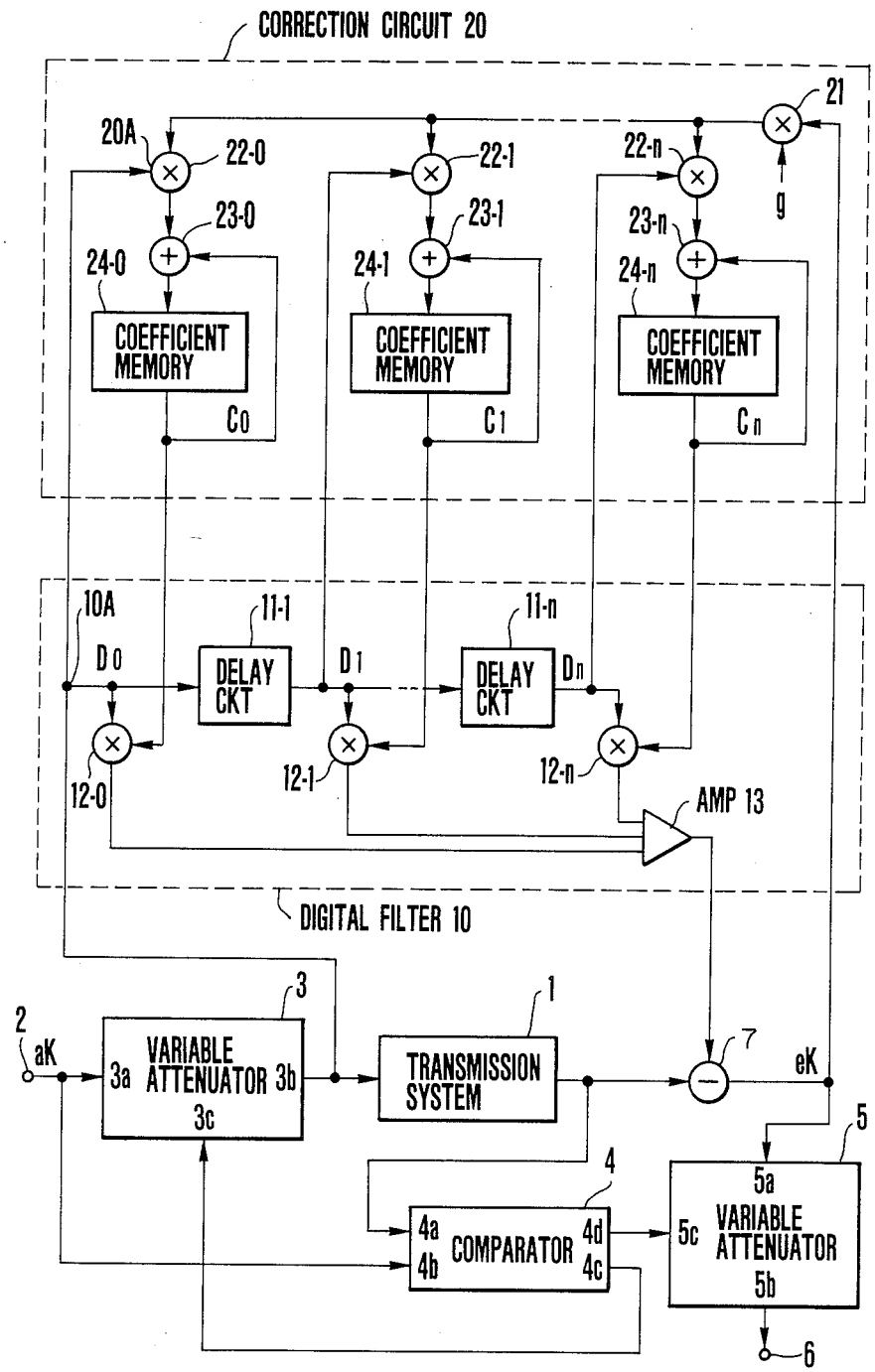
FIG. 1 is a block diagram of an adaptive digital filter according to an embodiment of the present invention.

Referring to FIG. 1, reference numeral 1 denotes a transmission system including a hand-free telephone circuit, one terminal of which is connected to a microphone and the other terminal of which is connected to a loudspeaker. In this transmission system, an output sound from the loudspeaker is often input to the microphone after a short period of time, thus causing acoustic coupling. In this case, the same input signal is looped between the microphone and loudspeaker while the signal is gradually attenuated, thus causing a singing phenomenon. The influence of the singing is indeterminate since the acoustic coupling state is indeterminate. Therefore, the transmission characteristics of the transmission system become indeterminate, and predetermined correction cannot compensate such indeterminate characteristics.

Reference numeral 2 denotes an analog signal input terminal of the transmission system 1. For example, a microphone input signal is supplied to the input terminal 2. The input terminal 2 is connected to an input terminal 3a of a variable attenuator 3 and an input terminal 4b of a comparator 4. An output terminal 3b of the variable attenuator 3 is connected to the input terminals of the transmission system 1 and a nonrecursive digital filter 10. The variable attenuator 3 changes an attenuation level for the input signal in response to a control signal applied to a control terminal 3c. In this embodiment, the attenuation level is set to be zero during normal operation, so that attenuation is performed only in response to the control signal.

An output terminal, e.g., a loudspeaker speech output signal output terminal of the transmission system 1, is connected to one input terminal of a subtractor 7 and an input terminal 4a of the comparator 4. The output terminal of the digital filter 10 is connected to the other input terminal of the subtractor 7. The output terminal of the subtractor 7 is connected to an input terminal 5a of a variable attenuator 5 and a correction circuit 20. An output terminal 5b of the variable attenuator 5 is connected to an output terminal 6. The variable attenuator 5 has the same function as the variable attenuator 3. Output terminals 4c and 4d of the comparator 4 are connected to control terminals 3c and 5c of the variable attenuators 3 and 5, respectively. The comparator 4 compares the signal input to the input terminal 4a with the signal input to the input terminal 4b. When the difference between the inputs to the terminals 4a and 4b exceeds a predetermined value, the comparator 4 supplies a control signal to one of the variable attenuators 3 and 5, which receives the signal with a lower level. This operation will be described later on.

The digital filter 10 comprises n delay circuits 11-1, . . . 11-n, which are series-connected, (n+1) multipliers 12-0, 12-1, . . . 12-n, and a mixing amplifier 13. The digital filter 10 has transmission characteristics similar to those of the transmission system 1. The input terminal of the first delay circuit 11-1 of the n series-connected delay circuits and one input terminal of the multiplier 12-0 are connected to the input terminal 10A of the digital filter 10. The output terminals of the delay circuits 11-1, . . . 11-n are connected to corresponding ones of input terminals of the multipliers 12-1, . . . 12-n, respectively. The other input terminal of each of the multipliers 12-0, 12-1, . . . 12-n is connected to a corresponding one of the output terminals of (n+1) coefficient memories 24-0, 24-1, . . . 24-n in a correction circuit 20 (to be described later). The output terminals of the multipliers 12-0, 12-1, . . . 12-n are connected to the (n+1) input terminals, respectively, of the mixing amplifier 13. The output terminal of the mixing amplifier 13 is connected to the other input terminal of the subtractor 7.

The input terminal 20A of the correction circuit 20 is connected to one input terminal of a multiplier 22-0. One input terminal of each of the n multipliers 22-1, . . . 22-n is connected to a corresponding one of the output terminals of the delay circuits 11-1, . . . 11-n in the digital filter 10. The other input terminal of each of the multipliers 22-0, . . . 22-n is connected to the output terminal of a multiplier 21. The output terminals of the multipliers 22-0, . . . 22-n are connected to corresponding ones of the input terminals of the n+1 adders 23-0, . . . 23-n, respectively. The output terminals of the adders 23-0, . . . 23-n are connected to input terminals of n+1 coefficient memories 24-0, . . . 24-n, respectively. The output terminal of the coefficient memory 24-i (where i is 0 to n) is connected to the other input terminal of the adder 23-i and to the other input terminal of the multiplier 12-i in the digital filter 10.

The operation of the adaptive digital filter shown in FIG. 1 will be described hereinafter. In normal operation without abrupt changes in characteristics of the transmission system, the comparator 4 sets the variable attenuators 3 and 5 in the inoperative state, and the input signal aK at the input terminal 2 is supplied to the transmission system 1, the input terminal 10A of the digital filter 10, and the input terminal 20A of the correction circuit 20. Outputs from the transmission system 1 and the digital filter 10 are supplied to the subtractor 7. The subtractor 7 calculates their difference. This difference signal is supplied to a multiplier 21 in the correction circuit 20 and to the variable attenuator 5. An input to the delay circuit 11-1 in the digital filter 10 is given as D0, and the output signals from the delay circuits 11-1, . . . 11-n are given as D1, . . . Dn, respectively. The respective signals Di (i=0 to n) are multiplied by the multipliers 12-0, . . . 12-n with the coefficient signals C0, C1, . . . Cn from the coefficient memories 24-0, . . . 24-n in the correction circuit 20. The products are mixed and amplified by the mixing amplifier 13 and serve as a subtrahend in the subtractor 7. The subtractor 7 performs a subtraction and generates a difference signal eK. The difference signal eK is multiplied by the multiplier 21 in the correction circuit 20 with the correction gain g. The products are multiplied by the multipliers 22-0, . . . 22-n with the input signal D0 and the delay signals Dj (j=i to n). The respective outputs from the multipliers 22-0, . . . 22-n are added to the current contents Cj (j=0 to n) of the coefficient memories 24-0, . . . 24-n, respectively, thus updating the coefficients Cj. The above operation is performed in units of sampling periods of the A/D converter, not shown, so that the coefficients Cj are sequentially corrected. The sequential correction algorithm can be given as follows:

$$C_j^{(v+1)} = C_j^{(v)} + g \cdot eK \cdot D_j \tag{1}$$

where $v$ is the sampling order.

Level control is performed while coefficients Cj are corrected.

Figure 2:
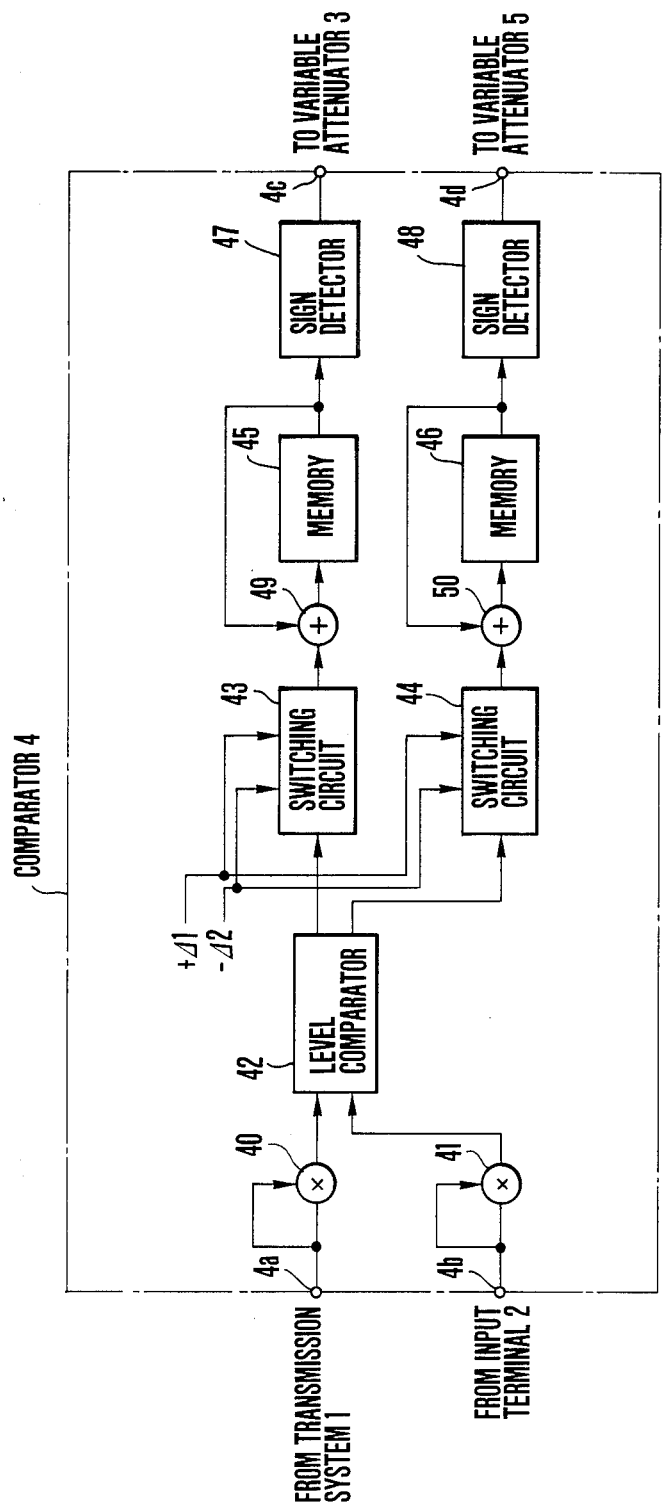
FIG. 2 is a block diagram showing a comparator of FIG. 1 when an input signal is normal.

FIG. 2 is a block diagram of the comparator 4. Referring to FIG. 2, the input terminals 4a and 4b are connected to a level comparator 42 through multipliers 40 and 41 for squaring the input signals. Two outputs from the level comparator 42 are supplied to switching circuits 43 and 44, corresponding to the variable attenuators 3 and 5, respectively. The switching circuits 43 and 44 receive predetermined positive and negative signals $+\Delta 1$ and $-\Delta 2$, respectively, and output the $+\Delta 1$ or $-\Delta 2$ signals in response to the output signal from the comparator 42. The output terminal of the switching circuit 43 is connected to an accumulator consisting of an adder 49 and a memory 45. The output terminal of the switching circuit 44 is connected to an accumulator consisting of an adder 50 and a memory 46. The output terminals of the memories 45 and 46 are connected to sign detectors 47 and 48, respectively. The sign detectors 47 and 48 detect the sign of the data in the memories 45 and 46, respectively. When the data is equal to a predetermined positive value, the sign detector 47 or 48 supplies a control signal to the output terminal 4c or 4d.

The operation of the comparator 4 in FIG. 2 will be described below. The comparator 4 squares the input signal aK and the output signal from the transmission system 1. The level of the squared input signal is compared by the comparator 42 with that of the squared output signal. The comparator 42 supplies a magnitude signal to the switching circuits 43 and 44. The switching circuits 43 and 44 supply a $+\Delta 1$ signal to the higher level side and a $-\Delta 2$ signal to the lower level side. The $+\Delta 1$ or $-\Delta 2$ signal from the switching circuit 43 or 44 goes to the memory 45 or 46. For example, when the level of the input signal aK is continuously higher than that of the output signal from the transmission system 1, a $+\Delta 1$ signal is added to the memory 46, and the storage content of the memory 46 goes positive. In this case, the variable attenuator 5 at the side of output terminal 6 is operated to attenuate and output the error signal eK. A $-\Delta 2$ signal is added to the memory 45, so its storage content goes negative. The variable attenuator 3 at the side of input terminal 2 is not operated, and the input signal aK is input without modification. However, when the signal level difference is reversed, the operation is also reversed. The reason why the attenuator is controlled by accumulation of the constants $+\Delta 1$ and $-\Delta 2$ is that the attenuator should not be operated in response to instantaneous level changes and that turn-on and turn-off periods of the attenuator are independently set.

Here, signal comparison is exemplified by digital comparison. However, an analog comparator with a proper time constant can be used in place of the digital comparator.

Figure 3:
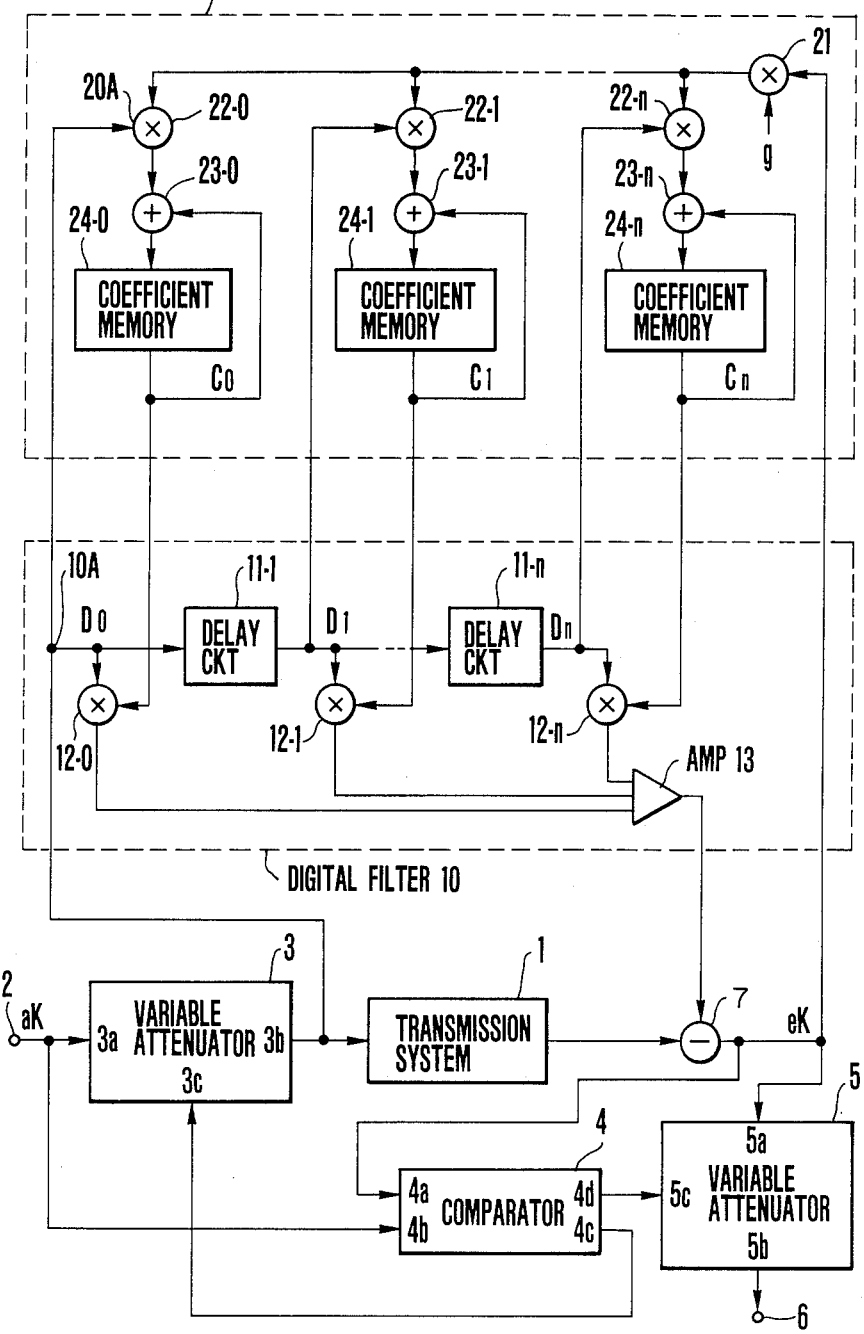
FIG. 3 is a block diagram of an adaptive digital filter according to another embodiment of the present invention.

FIG. 3 is a block diagram of an adaptive digital filter according to another embodiment of the present invention. The circuit in FIG. 3 is the same as that in FIG. 1 except that an input terminal 4a of a comparator 4 is connected to an output terminal of a subtractor 4. In the circuit shown in FIG. 3, the comparator 4 compares an input signal aK with an error signal eK. The smaller signal is supplied to and operates a variable attenuator 3 or 5.

What is claimed is:

1. An adaptive digital filter, comprising:
   a transmission system having an unknown characteristic; a nonrecursive digital filter for approximating the characteristics of said transmission system, said nonrecursive digital filter being provided with an input terminal connected to an input terminal of said transmission system, an output terminal, a plurality of delay elements connected in series between said input and output terminals of said nonrecursive digital filter, means for multiplying an input to said input terminal of said nonrecursive digital filter and outputs of said delay elements by corresponding coefficient parameters, respectively, and means for mixing results of the respective multiplications performed by said multiplying means to output a result of the mixing performed by said mixing means from said output terminal of said nonrecursive digital filter;
   a substractor means for calculating a difference between an output from said output terminal of said nonrecursive digital filter and an output of said transmission system to output a difference signal representing said difference;
   a correction circuit for supplying signals representing the coefficient parameters to said multiplying means of said nonrecursive digital filter,
   first variable attenuator means for receiving an input signal to said adaptive digital filter to variably attenuate the input signal in response to a first control signal and supplying a variably attenuated signal to said transmission system and said nonrecursive digital filter;
   second variable attenuator means for receiving the difference signal and variably attenuating the difference signal in response to a second control signal, the variably attenuated difference signal being supplied as an output signal of said adaptive digital filter; and
   comparing means for obtaining a level difference between the input signal to said adaptive digital filter and the output of said transmission system to output said first or second control signal in accordance with the level difference such that, when the level difference exceeds a predetermined value, said first variable attenuator or said second variable attenuator operates according to whether the level of the input signal to said adaptive digital filter is smaller than that of the output signal of said transmission system and vice versa, respectively.

2. A filter according to claim 1, wherein said comparing means comprises: two squaring circuits for squaring the output signal from said transmission system and the input signal, respectively;
   a level comparator for comparing squared values outputted from said two squaring circuits; and
   two control signal generators, corresponding to said first and second variable attenuator means, for receiving an output signal of said level comparator and generating a signal for operating one of said first and second variable attenuator means in accordance with a state of the output signal of said level comparator.

3. A filter according to claim 2, wherein each of said control signal generators comprises: a switching circuit for switching an output therefrom to a predetermined positive or negative value in response to the signal from said level comparator; memory means, connected to an output terminal of said switching circuit, for accumulating a signal corresponding to the positive or negative value; and a sign detector, connected to an output terminal of said memory means, for detecting a sign of a value accumulated in said memory means.

4. A filter according to claim 1, wherein the output from said transmission system which is supplied to said comparing means is a signal which has not been supplied to said subtractor means.

5. A filter according to claim 1, wherein the output from said transmission system which is supplied to said comparing means is an output signal from said subtractor means.

* * * * *

UNITED STATES PATENT AND TRADEMARK OFFICE
CERTIFICATE OF CORRECTION

PATENT NO. : 4,752,903

DATED : 6-21-88

INVENTOR(S) : Iwata et al.

It is certified that error appears in the above-identified patent and that said Letters Patent is hereby corrected as shown below:

| COLUMN | LINE | DESCRIPTION |
|--------|------|-------------|
| 4 | 07 | delete "g" insert --$\underline{g}$-- |

Signed and Sealed this

Twenty-second Day of November, 1988

*Attest:*

DONALD J. QUIGG

*Attesting Officer*  *Commissioner of Patents and Trademarks*